(12) United States Patent
Vetterli et al.

(10) Patent No.: US 11,332,912 B2
(45) Date of Patent: May 17, 2022

(54) DEVICE FOR DISPENSING HOT WATER

(71) Applicant: Franke Water Systems AG, Unterkulm (CH)

(72) Inventors: Heinz Vetterli, Wangen (CH); Andreas Ruegg, Hildisrieden (CH)

(73) Assignee: KWC AG, Hergiswil (CH)

( * ) Notice: Subject to any disclaimer, the term of this patent is extended or adjusted under 35 U.S.C. 154(b) by 355 days.

(21) Appl. No.: 16/485,659

(22) PCT Filed: Jan. 29, 2018

(86) PCT No.: PCT/EP2018/052081
§ 371 (c)(1),
(2) Date: Aug. 13, 2019

(87) PCT Pub. No.: WO2018/149624
PCT Pub. Date: Aug. 23, 2018

(65) Prior Publication Data
US 2019/0360183 A1     Nov. 28, 2019

(30) Foreign Application Priority Data

Feb. 14, 2017  (DE) .......................... 102017102956.7

(51) Int. Cl.
| | |
|---|---|
| E03C 1/04 | (2006.01) |
| E03C 1/044 | (2006.01) |
| F24D 19/10 | (2006.01) |
| F24H 1/12 | (2022.01) |

(Continued)

(52) U.S. Cl.
CPC ............ *E03C 1/0411* (2013.01); *E03C 1/044* (2013.01); *F24D 19/1051* (2013.01); *F24H 1/121* (2013.01); *F24H 9/2028* (2013.01); *G05D 23/1931* (2013.01); *F24D 2220/0271* (2013.01);

(Continued)

(58) Field of Classification Search
None
See application file for complete search history.

(56) References Cited

U.S. PATENT DOCUMENTS

| | | | | |
|---|---|---|---|---|
| 2,843,717 A | * | 7/1958 | Tracy ...................... | F24H 1/103 392/494 |
| 4,567,350 A | * | 1/1986 | Todd Jr. ................ | F24H 9/2028 219/213 |

(Continued)

FOREIGN PATENT DOCUMENTS

| | | |
|---|---|---|
| CN | 201218564 | 4/2009 |
| CN | 101686776 | 3/2010 |

(Continued)

*Primary Examiner* — Thor S Campbell
(74) *Attorney, Agent, or Firm* — Volpe Koenig

(57) ABSTRACT

Dispensing of hot water having an adjustable temperature by way of a water outlet fitting that can be installed on a sink. This is achieved by a continuous flow heater and a measured value sensor arranged in a water inlet of the water outlet fitting as the hot water heater. The measured value sensor detects a measurement variable with regard to water flowing through the continuous flow heater (10). The water dispensing device has a control unit, which is designed to regulate a flow rate through the continuous flow heater as a function of measured values of the measured value sensor in order to adjust the temperature of the hot water.

14 Claims, 2 Drawing Sheets

(51) Int. Cl.
*F24H 9/20* (2022.01)
*G05D 23/19* (2006.01)

(52) U.S. Cl.
CPC .. *F24D 2220/042* (2013.01); *F24D 2220/209* (2013.01)

(56) References Cited

U.S. PATENT DOCUMENTS

| | | | | |
|---|---|---|---|---|
| 5,367,605 | A * | 11/1994 | Violi | F24H 1/181 |
| | | | | 122/379 |
| 5,408,578 | A * | 4/1995 | Bolivar | F24H 1/102 |
| | | | | 219/481 |
| 5,479,558 | A * | 12/1995 | White, Jr | F24H 9/2028 |
| | | | | 219/497 |
| 5,740,315 | A * | 4/1998 | Onishi | F24H 1/121 |
| | | | | 392/489 |
| 6,351,603 | B2 * | 2/2002 | Waithe | F24D 19/1051 |
| | | | | 392/465 |
| 6,539,173 | B2 * | 3/2003 | Chu | F24H 9/2028 |
| | | | | 392/450 |
| 6,766,812 | B1 * | 7/2004 | Gadini | B01D 61/48 |
| | | | | 134/56 D |
| 6,823,878 | B1 * | 11/2004 | Gadini | A47L 15/4229 |
| | | | | 134/109 |
| 7,726,263 | B2 * | 6/2010 | Ben-Ishai | F24H 1/185 |
| | | | | 122/20 R |
| 7,773,868 | B2 * | 8/2010 | Moore | F24D 19/1051 |
| | | | | 392/490 |
| 8,165,461 | B2 * | 4/2012 | Sullivan | F24H 1/142 |
| | | | | 392/485 |
| 8,337,635 | B2 * | 12/2012 | Boussemart | A47J 31/60 |
| | | | | 134/166 C |
| 8,577,211 | B2 * | 11/2013 | Lucker | F24H 9/2028 |
| | | | | 392/470 |
| 8,787,742 | B2 * | 7/2014 | Lutz | F24H 1/102 |
| | | | | 392/451 |
| 9,175,458 | B2 * | 11/2015 | Meehan | E03C 1/055 |
| 9,938,700 | B2 * | 4/2018 | Shaw | B67D 1/0857 |
| 10,712,107 | B2 * | 7/2020 | Chen | B67D 1/0857 |
| 11,039,712 | B2 * | 6/2021 | Egli | A47J 31/60 |
| 11,045,042 | B2 * | 6/2021 | Vetterli | A47J 31/5255 |
| 2007/0261561 | A1 * | 11/2007 | Grossbach | F24D 19/1051 |
| | | | | 99/275 |
| 2008/0152331 | A1 * | 6/2008 | Ryks | F24H 1/06 |
| | | | | 392/490 |
| 2009/0293733 | A1 * | 12/2009 | Martin | G07F 13/065 |
| | | | | 99/280 |
| 2010/0294804 | A1 * | 11/2010 | Dalchau | B67D 1/0014 |
| | | | | 222/146.1 |
| 2011/0223309 | A1 | 9/2011 | Daburger et al. | |
| 2012/0291633 | A1 | 11/2012 | Goeltenboth et al. | |
| 2012/0312045 | A1 * | 12/2012 | Kim | F25B 7/00 |
| | | | | 62/238.6 |
| 2014/0023352 | A1 * | 1/2014 | Jurczyszak | F24H 1/105 |
| | | | | 392/466 |
| 2014/0348996 | A1 * | 11/2014 | Fischer | A23F 5/267 |
| | | | | 426/433 |
| 2016/0249767 | A1 * | 9/2016 | Santini | B08B 9/0321 |
| | | | | 99/290 |
| 2021/0289984 | A1 * | 9/2021 | Waechter | A47J 31/60 |

FOREIGN PATENT DOCUMENTS

| | | |
|---|---|---|
| CN | 203155614 | 8/2013 |
| CN | 106225215 | 12/2016 |
| DE | 4017695 | 12/1991 |
| DE | 102008028031 | 12/2009 |
| DE | 202010010509 | 11/2011 |
| DE | 102011076216 | 11/2012 |
| EP | 2080461 | 7/2009 |
| EP | 2226571 | 9/2010 |
| WO | 2005057086 | 6/2005 |
| WO | 2008099322 | 8/2008 |
| WO | 12134189 | 10/2012 |

* cited by examiner

DEVICE FOR DISPENSING HOT WATER

BACKGROUND

The present invention relates to a device for dispensing hot water, having a water outflow fixture which is able to be installed on a sink, and having a hot water preparation device which is arranged in a water inflow of the water outflow fixture.

For the purpose of extracting water in kitchens, use is made of kitchen fixtures which are installed on a sink. Most kitchen fixtures have inflows for warm water and cold water. The water temperature at the outflow is set via a mixer which is integrated in the fixture and by way of which the mixing ratio between warm and cold water can be set. Fixtures at which it is possible to dispense, normally in addition to warm and cold water, boiling hot water, which can be used for cooking, flushing, or for tea and coffee, are also known. This fixture thereby replaces the function of an additional water boiler. For this purpose, a hot water preparation device is connected to a corresponding hot water inflow of the fixture. In the case of cooking water fixtures known on the market, a pressurized boiler in which the correspondingly temperature-controlled hot water is stored serves as a hot water preparation device.

In the case of a fixture with a hot water function, it must be ensured that a user cannot inadvertently scald himself or herself with boiling hot water. The dispensing of the hot water is therefore generally realized via a separate outlet, it however at least being the case that the application of the hot water function is realized via a valve which is separate from the mixing valve for warm/cold water. Temperature regulation through addition of cold water is therefore not possible. Rather, the hot water can be dispensed only at the fixedly predefined temperature at which it is stored in the boiler.

One important application of such hot water fixtures is the extraction of boiling water for the preparation of hot beverages such as teas, brewed coffee or instant beverages. Here, however, the required water temperature can differ from beverage to beverage. In this regard, for example, ideally black tea is brewed at a temperature of 90° C., green tea is brewed at a temperature of 70 to 85° C., herbal tea is brewed at a temperature of 95° C. and coffee, depending on type, is brewed at a temperature of 86 to 96° C.

SUMMARY

The invention is based on the object of specifying a device for dispensing hot water, with which the temperature of the hot water is settable.

The object is achieved by one or more of the features of the invention advantageous configurations being described below and in the claims.

In a device for dispensing hot water of settable temperature, having a water outflow fixture which is able to be installed on a sink, and having a hot water preparation device which is arranged in a water inflow of the water outflow fixture, the object is achieved according to the invention in that the hot water preparation device is designed as a continuous flow heater, and in that, in the water inflow of the water outflow fixture, there is also arranged at least one measurement transducer, which determines a measurement variable with respect to water flowing through the continuous flow heater. Furthermore, the water-dispensing device has a controller, which is designed for regulating, in a manner dependent on measurement values of the measurement transducer, a rate of throughflow through the continuous flow heater in order to set the temperature of the hot water. Here, the temperature range to which the hot water can be heated is preferably a range of approximately 70° C. to 98° C.

The device according to the invention is thus based on the principle of heating the hot water to the desired temperature only during the dispensing by a continuous flow heater, instead of providing correspondingly pre-temperature-controlled hot water in a boiler for use at any time. Here, the invention is based on the realization that, at predefined heating power of the continuous flow heater, the end temperature of the hot water reached depends inter alia on the rate of throughflow. If it is sought to increase the temperature of the hot water at the outflow, then the rate of throughflow is reduced; if, conversely, it is sought to reduce the hot water temperature, then the rate of throughflow is increased.

Thus, with the invention, the advantage of a relatively low energy consumption, as it were, is achieved, since it is not necessary for a hot water reserve to be constantly held at temperature, but rather the hot water is heated instantaneously at the time of the supply and then only to the respectively desired temperature.

In a preferred embodiment, the regulation of the rate of throughflow is realized here in that, in the water inflow of the water outflow fixture, there is provided a water pump on the inflow side of the continuous flow heater, and the pump power of the water pump is adapted via the controller in order to vary the rate of throughflow. Here, the adaptation of the pump power of the water pump can be realized via phase-angle control, pulse-width modulation or rotational speed control, according to the type of pump used. Magnetic piston pumps, gearwheel pumps or impeller pumps may be used as the water pump.

As an alternative to a power-regulated water pump, in the water inflow of the water outflow fixture, there may also be provided a continuously-adjustable valve, which is actuated by the controller and by way of which the rate of throughflow can be varied by continuous or stepwise opening or closing.

It may also be expedient, in addition to regulating the rate of throughflow, also to set, in a manner dependent on the desired hot water temperature, the electrical heating power of the continuous flow heater. In this way, it is possible to cover a larger temperature range of the hot water and to select the setting range of the rate of throughflow, which setting range is required for the temperature setting, to be smaller, such that the variation in the rate of throughflow for the temperature setting is perceptible for a user only to a smaller extent.

It is possible inter alia for a throughflow meter which is arranged in the water inflow and by way of which the actual rate of throughflow is determined and the target rate of throughflow, and thus the end temperature reached when the continuous flow heater is flowed through, are, in a manner dependent on said actual rate of throughflow, regulated to serve as a measurement transducer.

Alternatively or cumulatively, it is also possible for provision to be made of a temperature sensor which is arranged downstream of the continuous flow heater in the flow direction and serves for determining an actual temperature of the hot water. The rate of throughflow can then be regulated in a manner dependent on the actual temperature in order to achieve a desired target temperature. It is also possible for the measurement of the actual temperature to be used merely for the monitoring or readjustment of the hot water temperature.

Within the scope of the present invention, it may also be provided that a second temperature sensor, which serves for determining an inflow temperature, is arranged upstream of the continuous flow heater in the flow direction. The inflow temperature can, particularly when subjected to temporal fluctuations, be incorporated as a further parameter in the regulation of the hot water temperature.

In a preferred embodiment, it is also provided that, between the continuous flow heater and the water outflow, there is arranged a first directional valve, via which a water flow coming from the continuous flow heater can be discharged directly into a drain. Via such a directional valve, the supply of water which has not yet reached the desired end temperature with the heating of the continuous flow heater can be discharged into the drain, thus ensuring that only water of the selected or desired hot water temperature is dispensed from the water outflow fixture. Also via such a directional valve, after completion of a hot water extraction process, hot water possibly remaining in the water outflow fixture can be emptied, with the result that no hot water drips or, with subsequent extraction of warm or cold water, is able to escape unintentionally from the water outflow fixture.

In a preferred refinement of the present invention, the device is equipped with a decalcification system for automatically decalcifying the continuous flow heater. This measure takes account of the realization that, with a continuous flow heater which is suitable within the scope of the present invention, due to the high temperatures required for heating the water rapidly and to the narrow but long flow paths in the continuous flow heater, the latter is prone to calcification. With the aid of the integrated decalcification system, it is possible to carry out decalcification of the continuous flow heater at any time and without extensive effort as soon as this is necessary.

In a preferred embodiment, the decalcification system comprises a mixing container for the mixing of a decalcifying agent solution, a receiving chamber for a storage container for liquid decalcifier concentrate, and a dosing pump for dosing and delivering decalcifier concentrate from the storage container into the mixing container. In this way, the decalcifying agent solution is, as required, that is to say whenever a decalcification process is to be carried out, mixed from the liquid decalcifier concentrate, which is automatically delivered from the storage container into the mixing container via the dosing pump, and water in the mixing container.

The use of a liquid decalcifier concentrate has the advantage that a quantity of concentrate can be stored for numerous decalcification processes in the device, with the result that, even with frequent decalcification processes, replacement or refilling of the storage container is necessary only at relatively long time intervals. This considerably reduces the required maintenance effort and allows the user to regularly carry out the decalcification without technical knowledge. Moreover, a liquid decalcifier concentrate can be dosed in a simple and operationally reliable manner via a dosing pump, with the result that the decalcifying agent solution can be mixed in an automated manner and at all times with the correct, desired dosing.

Here, the water-dispensing device expediently comprises a water pump which is arranged in the water inflow and which, on the suction side, is able to be connected to an extraction line of the mixing container in a switchable manner via a second directional valve in order, in the switched valve position of the second directional valve, for the decalcifying agent solution to be delivered from the mixing container to the hot water preparation device. Moreover, on the pressure side, the water pump is able to be connected to a filling line of the mixing container in a switchable manner via a third directional valve in order, in the switched valve position of the third directional valve, for water to be delivered to the mixing container. In this way, for the purpose of carrying out a decalcification process, the mixing container can be automatically filled with water, which is branched off upstream of the continuous flow heater, and the decalcifying agent solution can be mixed. It is possible via the throughflow meter arranged in the water path for the volume of water conducted into the mixing container to be measured.

In a refinement of the present invention, the throughflow meter can also be used for evaluating a calcification state of the continuous flow heater. Here, the controller is designed to infer a calcification state of the continuous flow heater from measurement values of the throughflow meter and, when a predefined value is reached, in particular for a maximum throughput time or a minimum rate of throughflow, to generate a message that an automatic decalcification process is required.

The control of automated decalcification processes is preferably realized here by the controller. This is programmed such that, for the purpose of carrying out an automatic decalcification process, it actuates the dosing pump in order for a predetermined quantity of decalcifier concentrate to be delivered from the storage container into the mixing container. The controller then switches the second directional valve in order to connect the water pump to the filling line of the mixing container and actuates the water pump in order for a predefinable quantity of water to be delivered into the mixing container. Finally, the controller switches the second directional valve in order to connect the water pump to the mixing container on the suction side and for the decalcifying agent solution to be delivered from the mixing container to the continuous flow heater. Here, a first valve which is situated downstream of the continuous flow heater and via which the decalcifying agent solution is directly conducted from the continuous flow heater into the drain, that is to say is not dispensed via the water outlet fixture, is preferably likewise switched.

BRIEF DESCRIPTION OF THE DRAWINGS

Further advantages and properties of the present invention will emerge from the following description of an exemplary embodiment on the basis of the figures.

DETAILED DESCRIPTION

Figure 1:
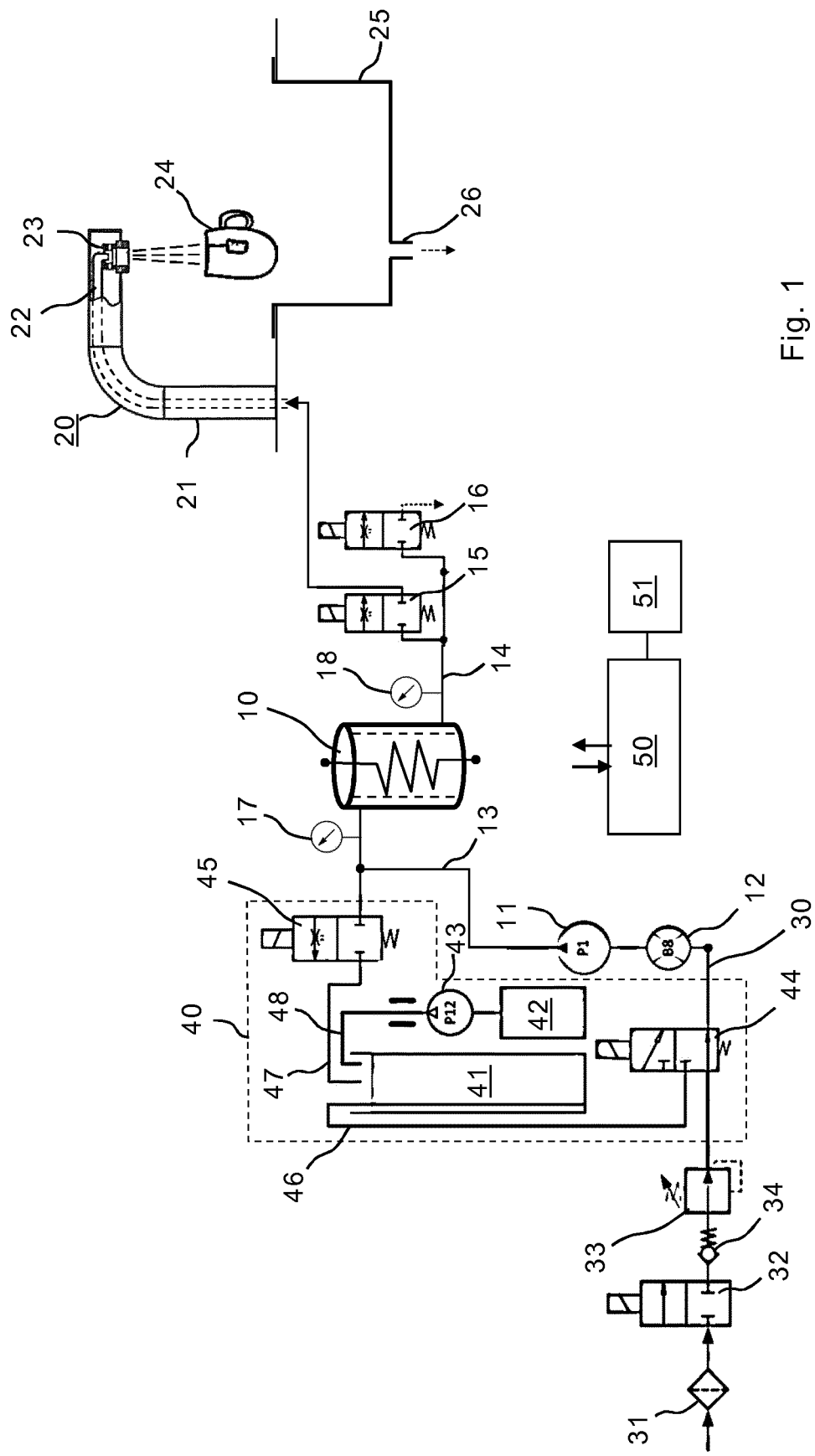
FIG. 1 shows a water flow diagram of a device for dispensing hot water, with a continuous flow heater as a hot water preparation device.

FIG. 1 shows a device for dispensing hot water of settable temperature. A continuous flow heater 10 which is situated in the water inflow of a hot water fixture 20 serves as a hot water preparation device. Via the hot water fixture 20, hot or boiling water can be dispensed, for example for the purpose of preparing tea or other hot beverages, into a drinking vessel 24 which is placed under the fixture 20. The hot water fixture 20 is installed on a kitchen sink 25, via which the water discharged from the hot water fixture 20 can (without the drinking vessel 24) flow away via a drain 26.

A water pump 11 and a throughflow meter 12 are situated upstream of the continuous flow heater 10 in the water flow direction and are connected to the continuous flow heater 10 via a line 13. Two directional valves 15, 16 are connected to the hot water outlet of the continuous flow heater 10 via a line 14. The outlet-side line 14 of the continuous flow heater 10 is connected to the inflow-side connection of the hot water fixture 20 via the directional valve 15. The line 14 can be directly connected to a drain via the directional valve 16. The function of the directional valves 15, 16 may also be realized in the same way by a common 3/2 directional valve.

Connected to the lines 13 and 14 upstream and downstream of the continuous flow heater 10 are respective temperature sensors 17, 18, via which the inflow temperature and the actual temperature of the heated hot water, respectively, can be determined.

In the exemplary embodiment, the throughflow meter 12 is arranged upstream of the water pump 11. However, it would be possible in the same way for the throughflow meter 12 to be arranged downstream of the water pump 11 in the flow direction. On the suction side, the water pump 11 is connected to a drinking water connection 31 of the public supply network via a drinking water supply line 30. A shut-off valve 32, a check valve 34 and a pressure reducer 33 are also provided in the supply line 30.

The water pump 11 delivers drinking water from the connected drinking water supply line 30 to the continuous flow heater 10 via the line 13. The heated drinking water can, via the line 14, be dispensed via the hot water fixture 20 with the directional valve 15 open.

The directional valves 15, 16, 32, and also the water pump 11 and the continuous flow heater 10, are actuated via a programmable controller 50. The controller 50 also reads the temperature sensors 17, 18 and the throughflow meter 12 and actuates the pump 11 and the continuous flow heater 10 accordingly. Via a user interface 51, the dispensing of hot water can be activated and the hot water temperature pre-selected. It is possible for different operating elements, such as switches, buttons, rotary regulators or the like, or else a touch display, to serve as user interface. It is also possible for the user interface to be connected via a WLAN or Bluetooth connection to a processor-controlled device, for example a smartphone, in order to control the dispensing of water by way of a corresponding smartphone app.

For the purpose of dispensing hot water, the programmable controller 50 opens the shut-off valve 32, activates the water pump 11 and the continuous flow heater 10 and, firstly, opens the bypass valve 16, which discharges the water supply into the drain. The pump power of the pump 11 is set, in a manner dependent on the rate of throughflow measured by the throughflow meter 12 and the supply temperature of the water determined via the temperature sensor 17, such that the actual temperature of the heated water measured by the temperature sensor 18 corresponds to the pre-selected target temperature. As soon as this is achieved, the valve 15 is opened and the valve 16 is closed. The hot water then flows through the hot water fixture 20 and is dispensed into a drinking vessel 24, placed thereunder, or the sink 25.

After completion of the discharging of hot water, the pump 11 is deactivated and the inflow valve 32 is closed. Furthermore, the valve 15 can be opened in order to empty hot water still remaining in the water outflow fixture 20 and the line 14 into the drain. Subsequently, the valve 15 is closed, with the result that no more hot water can drip through the fixture 20.

The power regulation of the pump is realized via phase-angle control. Here, the current is activated with delay, for example by a triac, after the zero crossing of the (alternating) supply voltage, with the result that current flows only over a part of each alternating voltage period. The delay time between the zero crossing and the activation of the current flow is settable here. In the same way, however, power regulation via pulse width modulation, for example in the case of a gearwheel pump, or rotational speed regulation of the pump is also possible and is included within the scope of the present invention.

As an alternative to the power regulation of the water pump 11, it is also possible for provision to be made in the water path of a settable continuously-adjustable valve, the valve opening of which is able to be varied in a continuous or stepwise manner. For example, as the valve, use may be made of a needle or disk valve that is driven by a stepper motor.

In the present exemplary embodiment, the hot water fixture is designed for dispensing both hot water and warm and cold water. This fixture has an outer outflow pipe 21 with an integrated inner water line 22 for the hot water. The hot water line 22 opens into an upper region of a mouth piece 23, at which the hot water flows out of the fixture 20.

Warm and cold water can, via the annular outer space of the outflow pipe 21, be conducted around the hot water line 22 and flow out through lateral channels of the mouth piece 23 to the mouth opening thereof. In order to prevent backflow of hot water from the hot water line 22 into the outer outflow pipe 21 via the mouth piece 23, the mouth piece may be provided at its lateral inflow channels with a check valve, for example in the form of elastic flaps. For warm and cold water, provision is made of a separate mixing valve, for example a single-lever mixer, this not however being illustrated in the figure. A hot water fixture which may be used within the scope of the present invention is described for example in EP 29 37 477 A1, to the full content of which reference is made hereby for the purpose of avoiding unnecessary repetitions.

The hot water line 22 integrated into the hot water fixture 20 is formed preferably of a material having a low thermal capacity and low thermal conductivity, for example of PTFE or some other plastic that is suitable for drinking water and (boiling) temperature-resistant. In this way, it is ensured that the hot water heated by the continuous flow heater 10 is cooled at most to an insignificant extent on the path through the supply line and the hot water fixture 20.

In the figure, the outflow pipe 21 is, for better illustration, drawn cut open in the front region such that the hot water line 22 and the mouth piece 23, which are situated in the interior of the outflow pipe 21, can be seen. However, the outlet pipe in fact of course extends beyond the downwardly open mouth piece 23 and is closed off at the front side. It should also be pointed out that the selected shape of the outlet pipe is purely schematic and exemplary, and that use may be made of any other desired outflows or hot water fixtures, with or without an integrated hot water line, within the scope of the present invention. As an alternative to the described hot water fixture having a hot water line integrated in the outflow, for the dispensing of hot water on the one hand, and warm and cold water with a settable mixing ratio on the other hand, it is specifically also possible for use to be made of separate fixtures or a combined fixture having separate outflows. These too are therefore included within the scope of the present invention.

In order to make possible rapid heating of the continuous flow heater 10 after activation, this preferably has a low thermal mass. For example, the continuous flow heater may be constructed in the form of a compact heating cartridge which is formed from a thin-walled cylindrical inner body, provided with electrical heating wires, and an outer cylindrical shell. Here, the shell surface of the cylindrical inner body is provided on the outside with a helical groove, which is delimited outwardly by the outer shell and thus forms a flow path for the drinking water to be heated.

Since, due to the high temperatures required for heating the water rapidly and to the narrow but long flow paths, the continuous flow heater 10 is prone to calcification, an optional decalcification system 40 is also provided in the exemplary embodiment. The decalcification system 40 comprises a mixing container 41, a storage container 42 for liquid decalcifier concentrate, and a dosing pump 43. The drinking water supply line 30 situated on the suction side of the water pump 11 can, via a switching valve 44, be connected to an intake line 46 which extends to the bottom of the mixing container 41, in order to suction in a decalcifying agent solution from the mixing container 41, and to deliver said solution to the continuous flow heater 10, for the purpose of decalcification.

The decalcifying agent solution is mixed in the mixing container 41 in that, via the dosing pump 43, a dosable quantity of the decalcifier concentrate is delivered into the mixing container via the supply line 48. Via a directional valve 45, which is connected to the supply line 13 connected on the pressure side to the pump 11, fresh water can be introduced via the supply line 47 into the mixing container 41 by the water pump 11. Here, the quantity of the fresh water introduced can be measured with the aid of the throughflow meter 12. The valve 45 is closed after a predetermined quantity of water has been introduced into the mixing container 41.

After the decalcifying agent solution has been mixed in the mixing container 41, the supply line 30 can be connected to the intake line 46 via the valve 44. Subsequently, the drainage valve 16 is opened and, via the water pump 11, the decalcifying agent solution is delivered from the mixing container 41 through the continuous flow heater 10. The continuous flow heater 10 can be in a switched-on state during the decalcification process since limescale residues are dissolved more quickly at higher temperatures of the decalcifying agent solution.

After completion of the decalcification process, the switching valve 44 is switched back into the operating position again, in which position the supply line 30 is connected to the water connection 31, and, by the water pump 11, the continuous flow heater 10 is once again flushed with fresh water. The optional check valve 34 prevents decalcifying agent solution possibly still present in the supply line 30 from being able to flow in the direction of the water inflow 31. The actuation of the valves 44, 45 and the dosing pump 43 can, in the same way as the actuation of the other directional valves, be realized via the controller 50, which thus also executes the decalcification process.

As decalcifier concentrate, use may be made, for example, of citric acid, malic acid or tartaric acid in the form of a concentrated solution. The decalcifier concentrate may either be introduced into disposable packs or, as required, added to a fillable storage container. Here, the storage container may be installed in a fixed manner in the water-dispensing device, preferably however being able to be extracted for the purpose of filling or replacement. In the case of a disposable container, said container may, for example, be opened and connected to the dosing pump 43, by being pierced with an extraction lance or a pin.

With the aid of the throughflow meter 12, it is possible to determine a rate of throughflow, that is to say the volumetric quantity per unit time, which flows through the continuous flow heater when hot water is being supplied. From this, a calcification state of the continuous flow heater can be deduced for a known pump power of the water pump 11, so that when a predefined value is reached, for example for a maximum throughput time or a minimum rate of throughflow, the controller 50 generates a message that an automatic decalcification process should be carried out. An operator can then start a decalcification process at the next opportune moment.

In the scope of the present exemplary embodiment, the continuous flow heater 10 is connected to a drinking water connection 31 of the public supply network. The inflow temperature of the supply water is thus approximately 10-20° C., depending on the season. However, it is also possible, and included within the scope of the invention, that the water inflow of the continuous flow heater 10 is connected to a warm water source, for example a central warm water supply or a boiler which is arranged upstream. For example, it is possible in such a boiler arranged upstream to store water already at a relatively high temperature, for example 65° C., with the result that the continuous flow heater 10 merely has to heat the drinking water by the temperature difference with respect to a settable dispensing temperature of for example 70° to 98° C. In this way, higher rates of throughput of for example 1 to 2 l/min can be realized.

Figure 2:
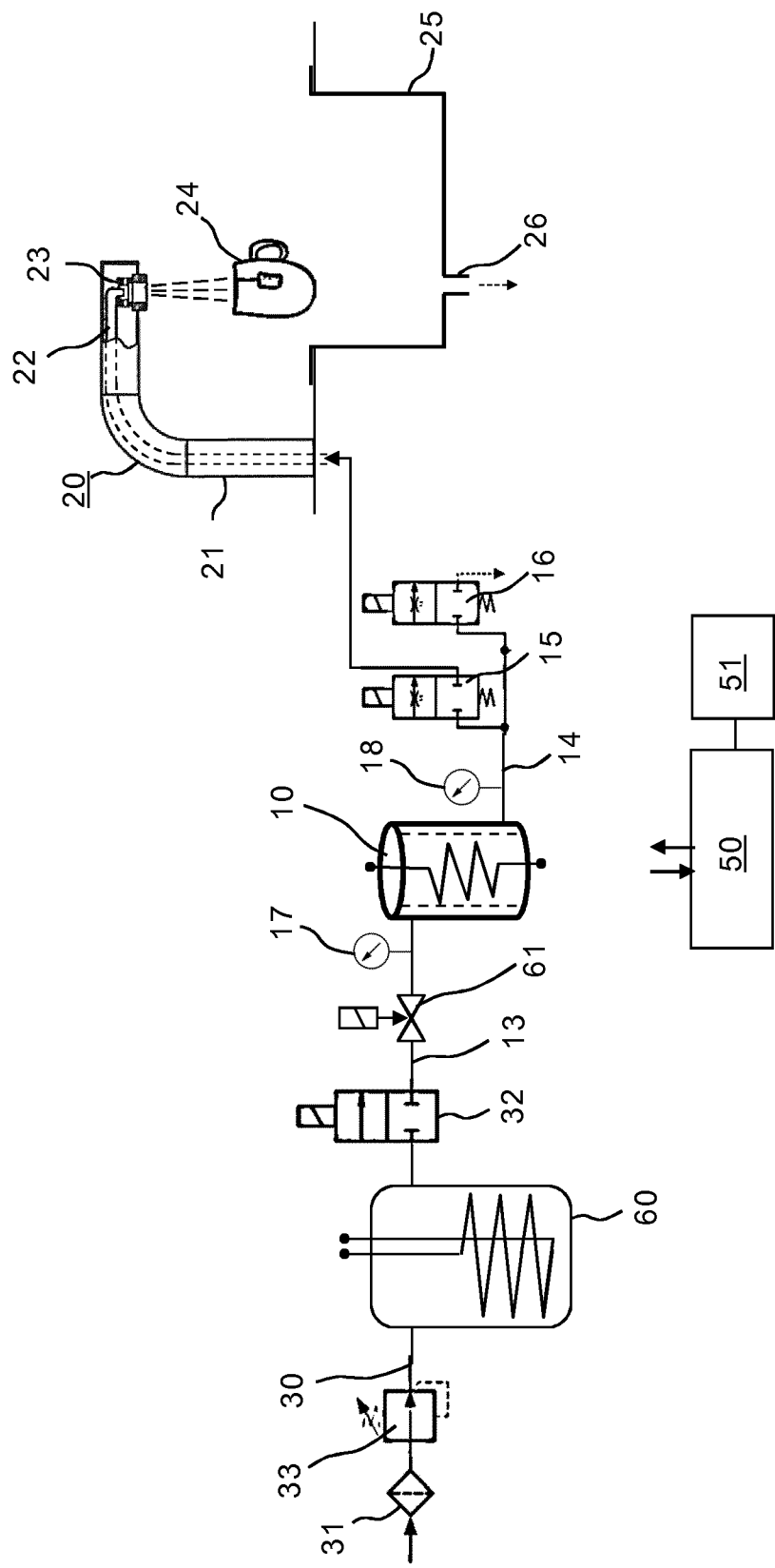
FIG. 2 shows a second exemplary embodiment, with a boiler arranged upstream of the continuous flow heater.

FIG. 2 shows an alternative, second exemplary embodiment, in which, instead of a water pump 11, a continuously-adjustable valve 61 is provided in the water supply line 30 in order to set the rate of throughflow through the continuous flow heater 10. The dispensing of water is thereby realized by way of the normal line pressure in the supply network, which is set to a constant value via a pressure reducer 33. A boiler in which, as mentioned above, pre-heated water is stored, is situated between the pressure reducer 33 and the inflow-side shut-off valve 32. An integrated decalcification system has been dispensed with in this exemplary embodiment.

The invention claimed is:

1. A water-dispensing device for dispensing hot water, the water-dispensing device comprising:
   a water outflow fixture (20) which is configured to be installed on a sink (25),
   a hot water preparation device arranged in a water inflow (30) of the water outflow fixture (20), the hot water preparation device comprises a continuous flow heater (10),
   at least one measurement transducer arranged in the water inflow (30) of the water outflow fixture (20), which determines a measurement variable with respect to water flowing through the continuous flow heater (10),
   a water pump (11) arranged in the water inflow (30) of the water outflow fixture (20) on the inflow side of the continuous flow heater (10),
   a controller (50) configured to regulate, in a manner dependent on measurement values of the measurement transducer (12), a throughflow rate of water through the continuous flow heater (10) in order to set the temperature of the hot water delivered to a hot water line (22) in a definable temperature range, and the controller (50) is further configured to regulate a pump power of the water pump (11) in order to vary the throughflow rate in a continuously adjustable manner such that if an increase in the temperature of the hot water from the hot water line is required, the throughflow rate is reduced, and if a reduction in the temperature of the hot water from the hot water line is required, the throughflow rate is increased.

2. The water-dispensing device as claimed in claim 1, wherein the controller (50) is further configured to set an electrical heating power of the continuous flow heater (10).

3. The water-dispensing device as claimed in claim 1, wherein the at least one measurement transducer comprises a throughflow meter (12) which determines an actual throughflow rate, and the controller (50) is configured to regulate a target throughflow rate through the continuous flow heater (10) in a manner dependent on said actual rate of throughflow.

4. The water-dispensing device as claimed in claim 1, wherein the at least one measurement transducer comprises a first temperature sensor (18), which is arranged downstream of the continuous flow heater (10) in the flow direction and is arranged to determine an actual temperature of the hot water.

5. The water-dispensing device as claimed in claim 4, wherein the at least one measurement transducer comprises a second temperature sensor (17), which is arranged upstream of the continuous flow heater in the flow direction and is arranged to determine an inflow temperature.

6. The water-dispensing device as claimed in claim 1, further comprising a first directional valve (16) arranged between the continuous flow heater (10) and the water outflow fixture (20), via which a water flow coming from the continuous flow heater is dischargeable directly into a drain.

7. The water-dispensing device as claimed in claim 1, further comprising a decalcification system (40) for automatically decalcifying the continuous flow heater (10), the decalcification system (40) comprises a mixing container (41) for mixing of a decalcifying agent solution, a receiving chamber for a storage container (42) for liquid decalcifier concentrate, and a dosing pump (43) configured to deliver decalcifier concentrate from the storage container (42) into the mixing container (41) in a dosed manner, the decalcifying agent solution being adapted to be mixed from decalcifier concentrate and water in said mixing container.

8. The water-dispensing device as claimed in claim 7, further comprising a water pump (11) arranged in the water inflow (30) of the water outflow fixture (20) and which, on a suction side, is connectable to an extraction line (46) of the mixing container (41) in a switchable manner via a second directional valve (44) in order, in a switched valve position of the second directional valve (44), for the decalcifying agent solution to be delivered from the mixing container (41) to the hot water preparation device (10).

9. The water-dispensing device as claimed in claim 8, wherein the water pump (11) which is arranged in the water inflow (30) of the water outflow fixture (20) is, on a pressure side, connectable to a filling line (47) of the mixing container (41) in a switchable manner via a third directional valve (45) in order, in a switched valve position of the third directional valve (45), for water to be delivered to the mixing container (41).

10. The water-dispensing device as claimed in claim 9, wherein the controller (50) is configured to infer a calcification state of the continuous flow heater (10) from meter values of a throughflow meter and, when a predefined value is reached, generates a message that an automatic decalcification process is required.

11. The water-dispensing device as claimed in claim 9, wherein the controller (50) is configured such that, for carrying out an automatic decalcification process, the controller actuates a dosing pump (43) in order for a predetermined quantity of decalcifier concentrate to be delivered from the storage container (42) into the mixing container (41), switches the third directional valve (45) in order to connect the water pump (11) to the filling line (47) of the mixing container (41), and actuates the water pump (11) in order for a predefinable quantity of water to be delivered into the mixing container (41), and is further configured to switch the second directional valve (44) in order to connect the water pump (11) to the mixing container (41) on the suction side and for the decalcifying agent solution to be delivered from the mixing container (41) to the continuous flow heater (10).

12. The water-dispensing device as claimed in claim 1, wherein a hot water boiler (60) is arranged upstream of the continuous flow heater (10).

13. The water-dispensing device as claimed in claim 1, wherein the water outflow fixture (20) includes the hot water line (22) which is integrated into a water outflow pipe (21) and which is comprised of a plastic that is suitable for drinking water and temperature-resistant.

14. The water-dispensing device as claimed in claim 1, wherein the definable temperature range is between 70° and 98° C.

* * * * *